(12) United States Patent
Lee

(10) Patent No.: US 7,440,060 B2
(45) Date of Patent: *Oct. 21, 2008

(54) LIQUID CRYSTAL DISPLAY DEVICE AND METHOD OF FABRICATING THE SAME

(75) Inventor: Yun-Bok Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 603 days.

This patent is subject to a terminal disclaimer.

(21) Appl. No.: 11/012,714

(22) Filed: Dec. 16, 2004
(Under 37 CFR 1.47)

(65) Prior Publication Data

US 2005/0206822 A1 Sep. 22, 2005

(30) Foreign Application Priority Data

Dec. 17, 2003 (KR) ........................ 10-2003-0092255

(51) Int. Cl.
*G02F 1/1343* (2006.01)
(52) U.S. Cl. ................. 349/141; 349/142; 349/143; 349/144; 349/145; 349/146
(58) Field of Classification Search .......... 349/141–146
See application file for complete search history.

(56) References Cited

U.S. PATENT DOCUMENTS

| 5,069,813 | A | | 12/1991 | Patel |
| 5,434,687 | A | | 7/1995 | Kawata et al. |
| 5,610,743 | A | | 3/1997 | Tsai |
| 6,111,627 | A | * | 8/2000 | Kim et al. ................. 349/141 |
| 6,243,154 | B1 | | 6/2001 | You et al. |
| 7,202,928 | B2 | * | 4/2007 | Lee et al. ................. 349/141 |
| 2001/0019382 | A1 | * | 9/2001 | Song et al. ................. 349/106 |
| 2001/0043304 | A1 | * | 11/2001 | Matsumoto ................. 349/141 |
| 2003/0053020 | A1 | | 3/2003 | Okada et al. |
| 2005/0128412 | A1 | * | 6/2005 | Lee ........................ 349/143 |

FOREIGN PATENT DOCUMENTS

| JP | 9325340 | | 12/1997 |
| KR | 1997-0079063 | | 12/1997 |
| KR | 1999-058889 | | 7/1999 |
| KR | 99058889 | A * | 7/1999 |

* cited by examiner

*Primary Examiner*—David C. Nelms
*Assistant Examiner*—Phu Vu
(74) *Attorney, Agent, or Firm*—McKenna Long & Aldridge LLP

(57) ABSTRACT

A liquid crystal display device includes: gate lines and data lines on a first substrate, the gate lines and the data lines crossing each other and defining a pixel region; a thin film transistor adjacent to a crossing of the gate and data lines; a common line in parallel to the gate line; a common electrode extending from the common line and having a circular shape; a pixel electrode connected to the thin film transistor and having a circular shape; an auxiliary common line on a second substrate spaced apart from and facing the first substrate; an auxiliary common electrode extending from the auxiliary common line and having a circular shape; and a liquid crystal layer between the first and second substrates.

27 Claims, 13 Drawing Sheets

LIQUID CRYSTAL DISPLAY DEVICE AND METHOD OF FABRICATING THE SAME

This application claims the benefit of Korean Patent Application No. 2003-0092255, filed on Dec. 17, 2003, which is hereby incorporated by reference.

BACKGROUND OF THE INVENTION

1. Field of the Invention

The present invention relates to a liquid crystal display device, and more particularly, to an in-plane switching (IPS) liquid crystal display device and a method of fabricating the same.

2. Discussion of the Related Art

A liquid crystal display device uses the optical anisotropy and polarization properties of liquid crystal molecules to produce an image. The long and thin shaped liquid crystal molecules can all have the same definite orientational alignment direction. That alignment direction can be controlled by an applied electric field. In other words, as an applied electric field changes, so does the alignment direction of the liquid crystal molecules. Due to optical anisotropy, the refraction of incident light depends on the alignment direction of the liquid crystal molecules. Thus, by properly controlling an applied electric field, a desired light image can be produced.

Of the different types of liquid crystal displays (LCDs), active matrix LCDs (AM-LCDs), which have thin film transistors (TFTs) and pixel electrodes arranged in a matrix form, have been the subject of significant research and development because of their high resolution and superiority in displaying moving images. LCD devices have a wide range of applications in office automation (OA) equipment and video units because they are light, thin and have low power consumption. The liquid crystal display panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon the polarity and the amount of applied voltage.

Since the pixel and common electrodes are positioned on the lower and upper substrates, respectively, an electric field induced between them is perpendicular to the lower and upper substrates. However, the LCD devices having this perpendicular electric field have a drawback in that they have a very narrow viewing angle. In order to solve the problem of narrow viewing angle, in-plane switching liquid crystal display (IPS-LCD) devices have been developed. IPS-LCD devices include a lower substrate where a pixel electrode and a common electrode are disposed, an upper substrate having no electrode, and a liquid crystal interposed between the upper and lower substrates. A detailed explanation about operation modes of an IPS-LCD panel will be provided with reference to FIG. 1.

FIG. 1 is a cross-sectional view illustrating a concept of a related art IPS-LCD panel. As shown in FIG. 1, upper and lower substrates 10 and 20 are spaced apart from each other, and a liquid crystal layer 30 is interposed therebetween. The upper and lower substrates 10 and 20 are often referred to as an array substrate and a color filter substrate, respectively. A common electrode 22 and a pixel electrode 24 are positioned on the lower substrate 20. The common and pixel electrodes 22 and 24 are aligned parallel to each other. A color filter layer (not shown) is positioned on a surface of the upper substrate 10 between the pixel electrode 24 and the common electrode 22 of the lower substrate 20. A voltage applied across the common and pixel electrodes 22 and 24 produces an electric field 26 through the liquid crystal 32. The liquid crystal 32 has a positive dielectric anisotropy, and thus it aligns parallel to the electric field 26.

When no electric field is applied across the common electrode 22 and pixel electrode 24, such as an off-state, the longitudinal axes of the liquid crystal (LC) molecules 32 are parallel and form a definite angle with respect to the common electrode 22 and pixel electrode 24. For example, the longitudinal axes of the LC molecules 32 are arranged parallel with both the common and pixel electrodes 22 and 24. In contrast, when a voltage is applied across the common electrode 22 and pixel electrode 24, such as an on state, an in-plane electric field 26 that is parallel to the surface of the lower substrate 20 is produced because the common and pixel electrodes 22 and 24 are on the lower substrate 20. Accordingly, the LC molecules 32 are re-arranged to bring their longitudinal axes into coincidence with the electric field 26. This results in a wide viewing angle that ranges from about 80 to 85 degrees in up-and-down and left-and-right directions from a line vertical to the IPS-LCD panel, for example.

FIG. 2 is a plan view illustrating one pixel of an array substrate according to the related art IPS-LCD device. As shown, gate lines 40 are transversely arranged and data lines 42 are disposed substantially perpendicular to the gate lines 40. A common line 50 is also transversely arranged in parallel with the gate line 40 and is spaced apart from the gate line 40. The gate line 40, the common line 50 and a pair of the data lines 42 define a pixel region P on the array substrate. A thin film transistor (TFT) is disposed at a corner of the pixel region P near the crossing of the gate and data lines 40 and 42.

In each pixel, three common electrodes 44 extend perpendicularly from the common line 50, and two of the common electrodes 44 are disposed next to the data lines 42, respectively. A pixel connecting line 48 is disposed in parallel next to the gate line 40 and is electrically connected to the TFT T. Pixel electrodes 46 extend perpendicularly from the pixel connecting line 48 toward the common line 50. Each of the pixel electrodes 46 is disposed between two of the common electrodes 44 and in parallel with the data line 42. Each of areas I between the respective common electrodes 44 and the respective pixel electrodes 46 is defined as a block where the liquid crystal molecules are re-arranged by the electric fields. As shown in FIG. 2, there are four blocks in one pixel.

The IPS-LCD device according to the related art in FIG. 2 re-arranges and operates the liquid crystal molecules using the electric field that is parallel with the array substrate. Thus, it can provide a wider viewing angle as compared to the LCD device that use an electric field perpendicular to the array substrate. Some additional modifications to the IPS-LCD device have been developed in order to further increase the viewing angle.

FIG. 3 is a plan view of an array substrate for use in an IPS-LCD device having multiple domains according to the related art. With reference to FIG. 3, some of the detailed explanations previously explained with reference to FIG. 2, will be omitted in order to prevent duplicate explanations. As shown in FIG. 3, a pixel connecting line 58 is disposed over a common line 60. A common electrode 54 and pixel electrode 56 extend from the common and pixel connecting lines 60 and 58, respectively, in an up-and-down direction. Both the common electrode 54 and pixel electrode 56 have a zigzag shape with a plurality of bent portions, but they are parallel to each other and arranged alternately. The zigzag shaped electrodes define multidomains in the pixel regions between the bent portions of the common and pixel electrodes 54 and 56. These zigzag shaped electrodes providing multidomains that improves viewing angle as compared to the straight shaped electrodes of FIG. 2. The IPS-LCD device having the above-mentioned multidomains has a problem of color shifting depending on the viewing angles, because the liquid crystal molecules have long and thin shapes.

As also shown in FIG. 3, the pixel connecting line 58 overlaps the common line 60, so that the overlapped area becomes a storage capacitor $C_{ST}$. More specifically, the pixel connecting line 58 acts as one electrode of the storage capacitor $C_{ST}$, while the overlapped portion of the common line 60 acts as the other electrode of the storage capacitor $C_{ST}$. One of the pixel electrodes 56 is connected to a drain electrode 62 so that all of the pixel electrodes 56 can electrically communicate with the TFT T.

FIG. 4 is a graph illustrating viewing angle properties of the IPS-LCD device having the zigzag structure of FIG. 3. The IPS-LCD device having the zigzag-shaped common and pixel electrodes has the improved viewing angles in directions of ±90 and ±180 degrees, such as right-and-left and up-and-down directions, as illustrated by references IVa and IVb in FIG. 4. However, the viewing angles are degraded in directions of ±45 and ±135 degrees, such as the diagonal directions, as illustrated by references IVc and IVd in FIG. 4. Further, color shift also occurs depending on the viewing angles or directions.

When the voltages applied to the electrodes generate the electric fields between the common and pixel electrodes, the liquid crystal molecules rotate about 45 degrees in accordance with the electric fields. This causes gray inversion due to the rotation of the liquid crystal molecules. In particular, when the IPS-LCD is operated in gray mode, the IPS-LCD produces yellowish color in 45(+45) degrees declination with respect to the liquid crystal polarization because of the optical anisotropy properties of the liquid crystal molecules. The IPS-LCD also produces bluish color in 135(−45) degrees declination with respect to the liquid crystal polarization because of the optical anisotropy properties of the liquid crystal molecules.

SUMMARY OF THE INVENTION

Accordingly, the present invention is directed to a liquid crystal display device and a method of fabricating the same that substantially obviates one or more of the problems due to limitations and disadvantages of the related art.

An object of the present invention is to provide a liquid crystal display device and a method of fabricating the same having a large viewing angle.

Another object of the present invention is to provide a liquid crystal display device and a method of fabricating the same to prevent a color shift.

Another object of the present invention is to provide a liquid crystal display device and a method of fabricating the same having uniform oreintations of liquid crystal molecules in all directions.

Another object of the present invention is to provide a liquid crystal display device and a method of fabricating the same to prevent cross talk.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, exemplary embodiments in accordance with the principles of the present invention provides a liquid crystal display device, which includes: gate lines and data lines on a first substrate, the gate lines and the data lines crossing each other and defining a pixel region; a thin film transistor adjacent to the crossing of the gate and data lines; a common line in parallel to the gate lines; a common electrode extending from the common line and having a circular shape; a pixel electrode connected to the thin film transistor and having a circular shape; an auxiliary common line on a second substrate spaced apart from and facing the first substrate; an auxiliary common electrode extending from the auxiliary common line and having a circular shape; and a liquid crystal layer between the first and second substrates.

In another aspect, a method of fabricating a liquid crystal display device includes: forming a common electrode having a circular shape on a first substrate; forming a pixel electrode having a circular shape on the first substrate, the common electrode alternating with the pixel electrode; forming an auxiliary common electrode having a circular shape on a second substrate; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the present invention and together with the description serve to explain the principles of that invention.

DETAILED DESCRIPTION OF THE PREFERRED EMBODIMENTS

Reference will now be made in detail to exemplary embodiments of the present invention, examples of which are shown in the accompanying drawings. Wherever possible, similar reference numbers will be used throughout the drawings to refer to the same or similar parts.

Figure 1:
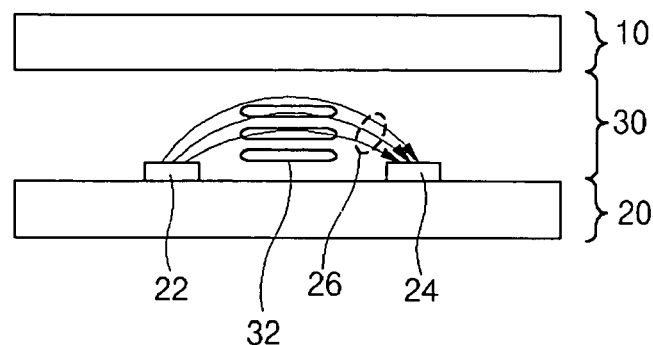
FIG. 1 is a cross-sectional view illustrating a concept of a related art IPS-LCD panel.
Figure 2:
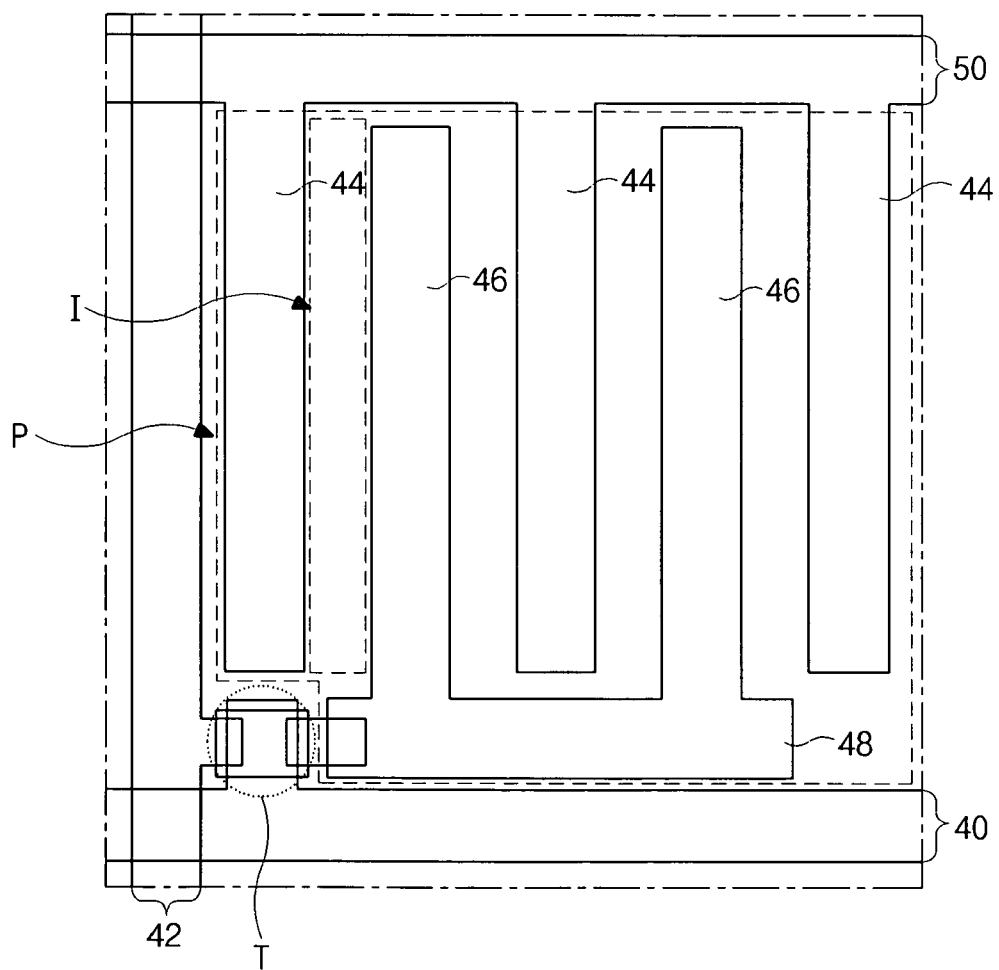
FIG. 2 is a plan view illustrating one pixel of an array substrate according to the related art IPS-LCD device.
Figure 3:
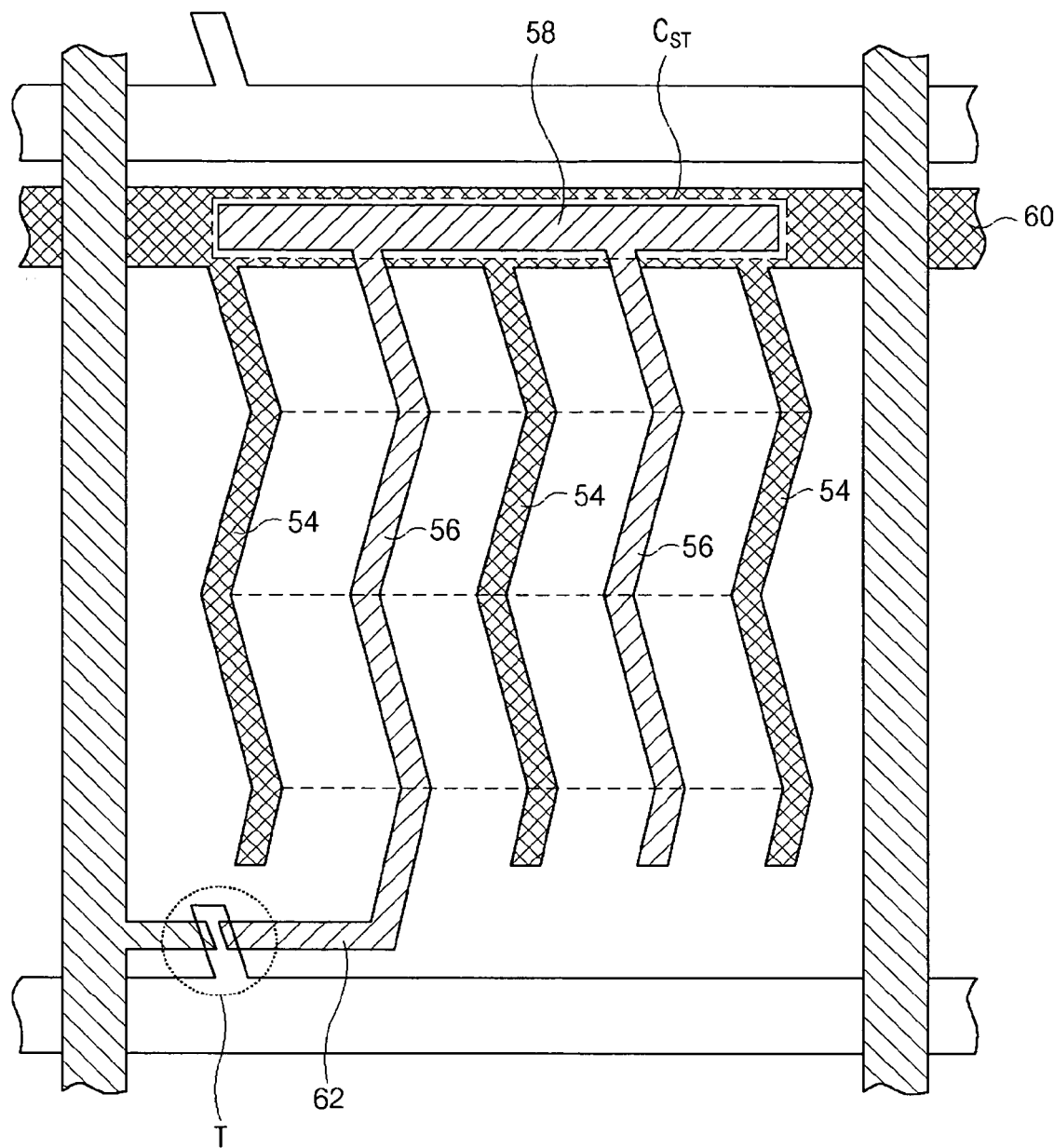
FIG. 3 is a plan view of an array substrate for use in an IPS-LCD device having multiple domains according to the related art.
Figure 4:
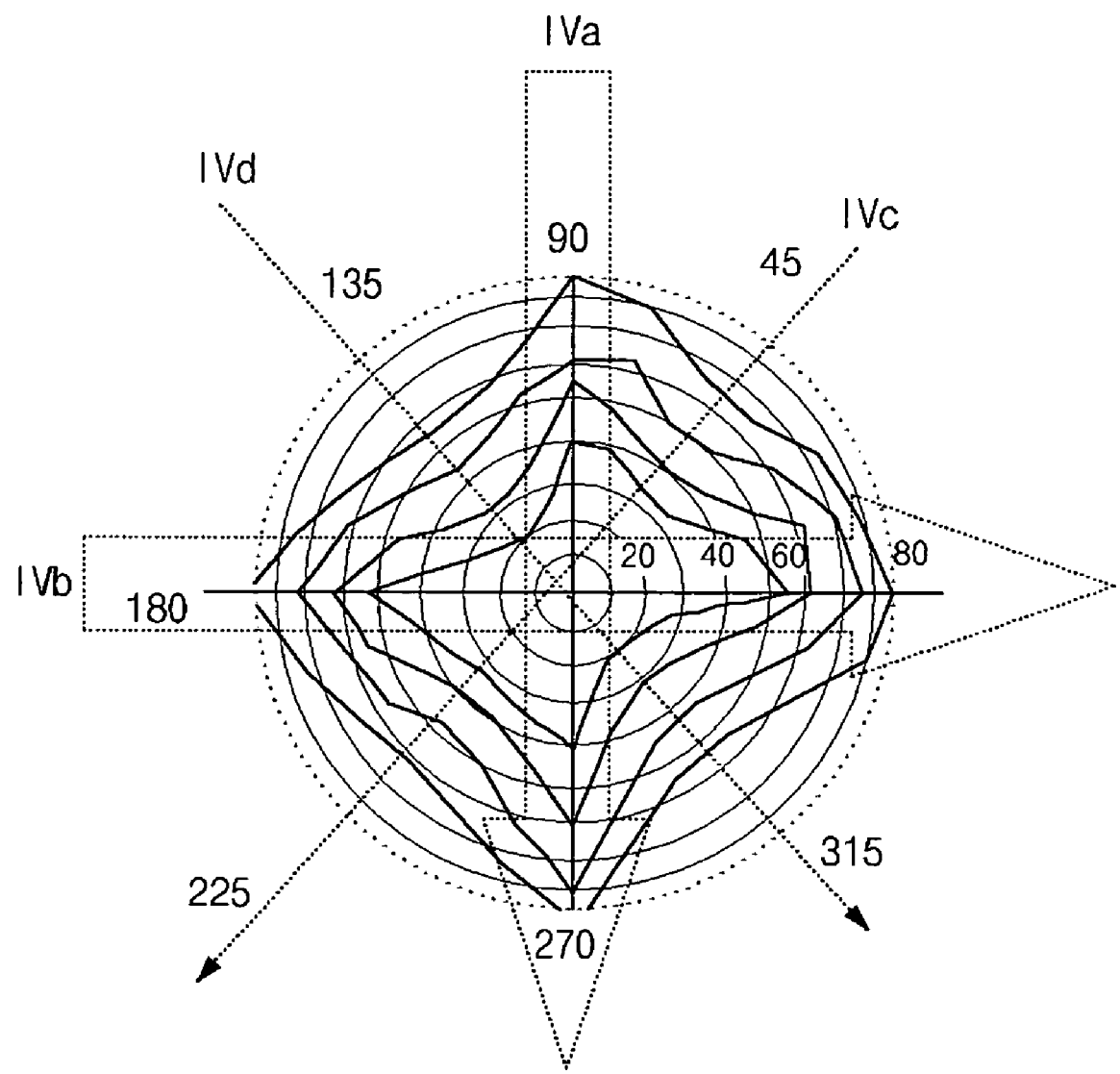
FIG. 4 is a graph illustrating viewing angle properties of the IPS-LCD device having the zig zag structure of FIG. 3.
Figure 5A:
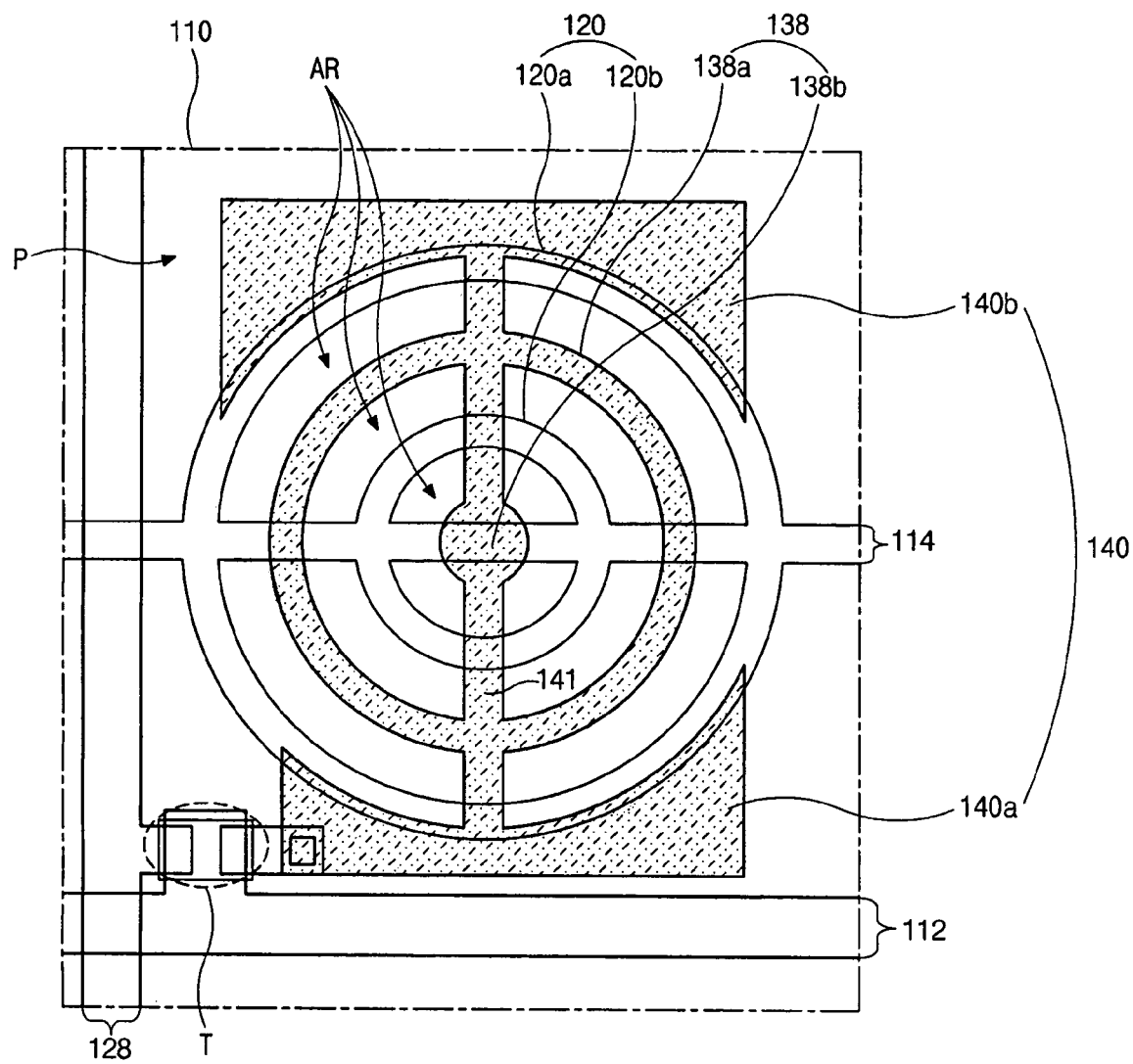
FIGS. 5A and 5B are plan views illustrating a liquid crystal display device according to a first embodiment of the present invention.
Figure 5B:
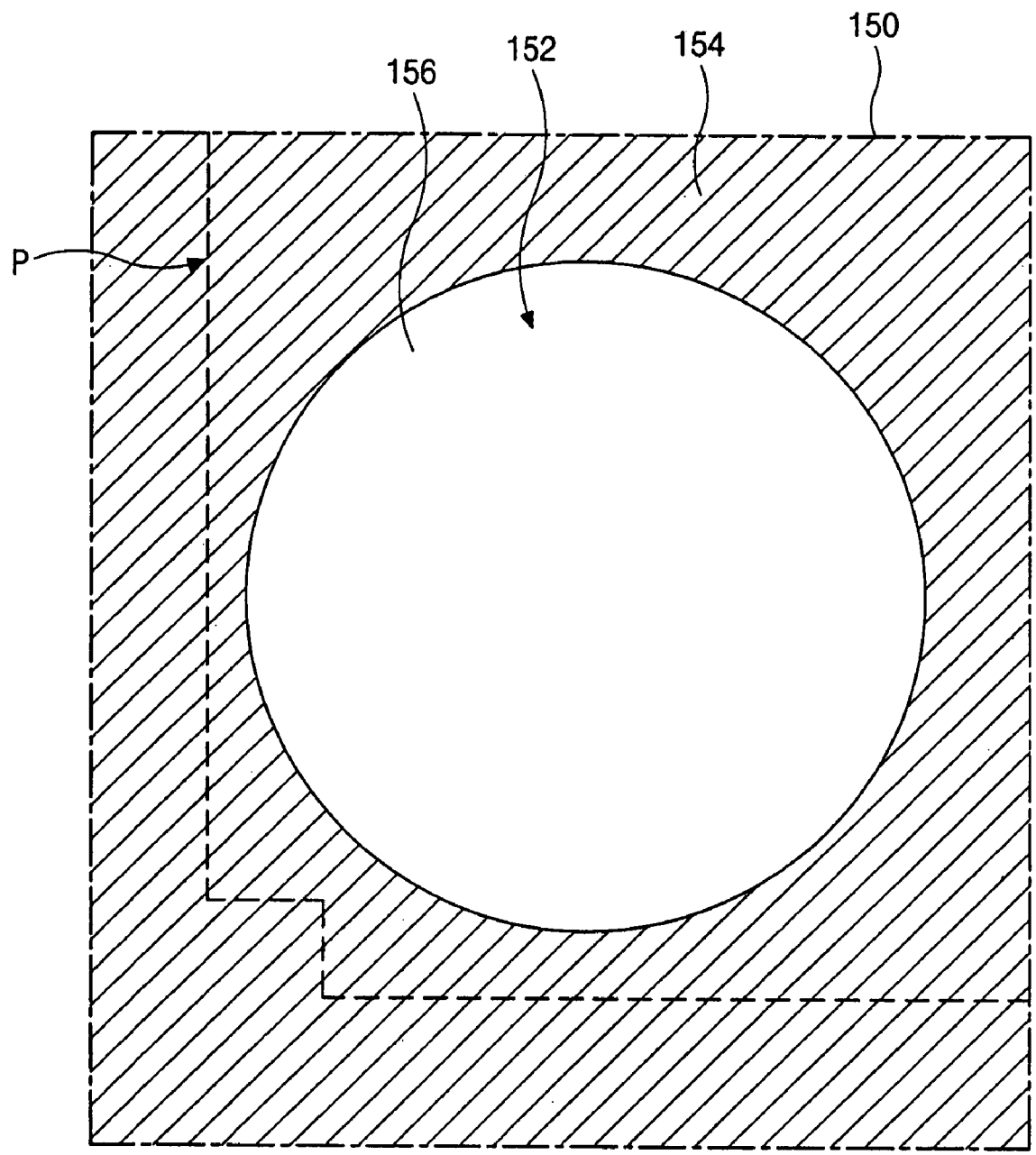

FIGS. 5A and 5B are plan views illustrating a liquid crystal display device according to a first embodiment of the present invention. FIG. 5A shows an array substrate including a thin film transistor and FIG. 5B shows a color first substrate facing the array substrate. In the first embodiment of the present invention, common and pixel electrodes have a circular band or circular band shape.

As shown in FIG. 5A, a gate line 112 is formed on a first substrate 110 in a first direction and a data line 128 is formed in a second direction crossing the first direction. A common line 114 is formed in the first direction to be spaced apart from the gate line 112. It is understood that the term "line" refers to a structure that carries a signal. The term "line" does not refer to or limit the shape of that structure. A thin film transistor (TFT) T is disposed adjacent to a crossing of the gate and data lines 112 and 128. The gate and data lines 112 and 128 define a pixel region P.

In the pixel region P, a pixel electrode 138 and a common electrode 120 are formed. The common electrode 120 extends from the common line 114 and has a circular band shape. The pixel electrode 138 of a circular band shape is spaced apart from the common electrode 120 and is connected to the thin film transistor T. An opening area AR, which also has a circular band shape, between the common electrode 120 and the pixel electrode 138, is bordered by the common electrode 120 and the pixel electrode 138. More particularly, the common electrode 120 includes a first common electrode pattern 120a disposed in the outer portion of the pixel region P and a second common electrode pattern 120b inside the first common electrode pattern 120a. The first and second common electrode patterns 120a and 120b are shaped like a circular band and extend from the common line 114. The pixel electrode 138 includes first and second pixel electrode patterns 138a and 138b. The first pixel electrode pattern 138a having a circular band shape is disposed between the first and second common electrode patterns 120a and 120b, and the second pixel electrode pattern 138b having a circular shape is disposed inside the circular band-shaped second common electrode pattern 120b.

A capacitor electrode 140 spaced apart from the first pixel electrode pattern 138a is formed in an area where the first common electrode pattern 120a is disposed such that the capacitor electrode 140 overlaps the first common electrode pattern 120a and constitutes a storage capacitor with the overlapped portions of the first common electrode pattern 120a. The capacitor electrode 140 includes a first capacitor electrode pattern 140a and a second capacitor electrode pattern 140b, respectively, in bottom and top portions of the pixel region P. The first capacitor electrode pattern 140a is connected to the second capacitor electrode pattern 140b through a pixel connecting line 141 and the second capacitor electrode pattern 140b is connected to the thin film transistor T.

The pixel connecting line 141 is formed in parallel to the data line 128 in the middle of the pixel region P and connects the first and second capacitor electrode patterns 140a and 140b. Furthermore, the pixel connecting line 141 also connects the first pixel electrode pattern 138a to the second pixel electrode pattern 138b. Accordingly, the pixel electrode 138, the capacitor electrode 140 and the pixel connecting line 141 may be formed as one body in the same patterning process.

In FIG. 5B, a black matrix 154 is formed on a second substrate 150. The black matrix 154 has a circular opening 152 exposing the main portion of the pixel region P. A color filter layer 156 is formed on the black matrix 154. The color filter layer 156 covers the circular opening 152 and partially overlaps the black matrix 154. Although not shown in detail, the color filter layer 156 is composed of red, green and blue sub-color filters, each of which is sequentially arranged in each pixel region P. There is no electrode on the second substrate 150.

Figure 6:
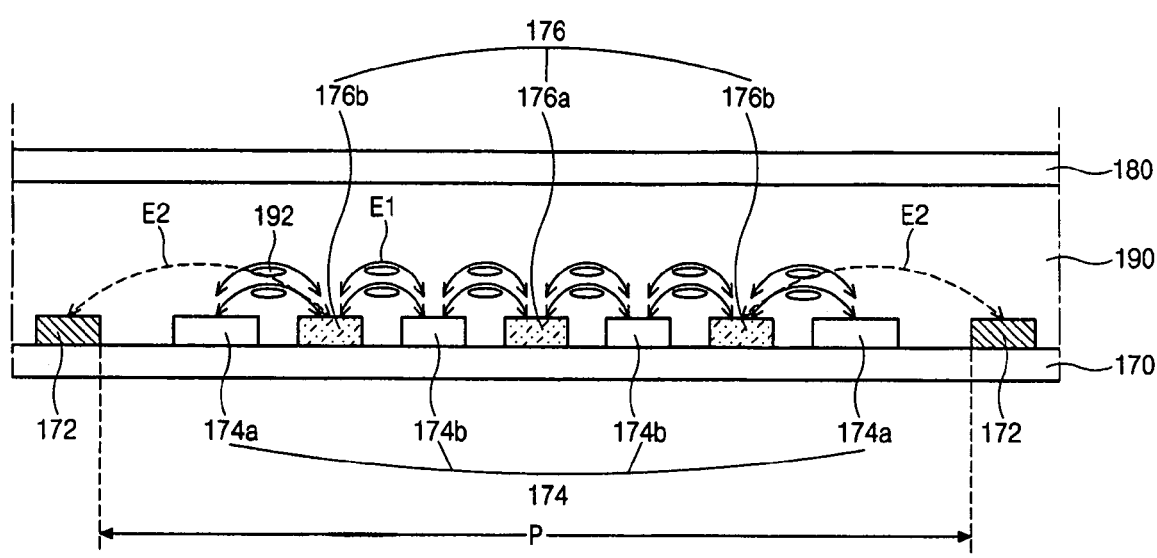
FIG. 6 is a cross-sectional view of the liquid crystal display device according to the first embodiment of the present invention.

FIG. 6 is a cross-sectional view of the liquid crystal display device according to the first embodiment of the present invention, and shows characteristics of an electric field induced between pixel and common electrodes. As shown in FIG. 6, adjacent data lines 172 are disposed on a first substrate 170, and a pixel region P is defined between the adjacent data lines 172. A common electrode 174 and a pixel electrode 176 are formed in the pixel region P and are spaced apart from each other. The common electrode 174 includes a plurality of common electrode patterns 174a and 174b and the pixel electrode 176 includes a plurality of pixel electrode patterns 176a and 176b. The common electrode patterns 174a and 174b are alternatively arranged with the pixel electrode patterns 176a and 176b. A second substrate 180 is disposed over the first substrate 170 and a liquid crystal layer 190 is interposed between the first and second substrates 170 and 180.

When a voltage is applied, a lateral electric field E1 is induced between the common electrode 174 and the pixel electrode 176. Thus, liquid crystal molecules 192 are driven horizontally with respect to the substrates 170 and 180 by the lateral electric field E1, and viewing angles may be widened. However, an electric field E2 is also induced between the data line 172 and the pixel electrode 176 that causes cross talk, which lowers image quality.

To reduce cross talk, the outer common electrode pattern 174a is formed to have a wider width than the inner common electrode pattern 174b. The wider outer common electrode pattern 174a lowers the aperture ratio. In addition, to minimize occurrence of cross talk, the black matrix should be formed of a resin material that has relatively low dielectric constant and blocks light. Thus, manufacturing costs increase as compared to devices using cheaper materials, such as chromium (Cr), and there may be a limitation on choosing a material for the black matrix to reduce the cost. Because liquid crystal molecules are driven by an electric field parallel to the substrates in the IPS mode, a driving voltage of the IPS LCD device is higher than that of a TN (twisted nematic) LCD device such that power consumption in the IPS LCD device is higher than that of a TN LCD device.

Figure 7A:
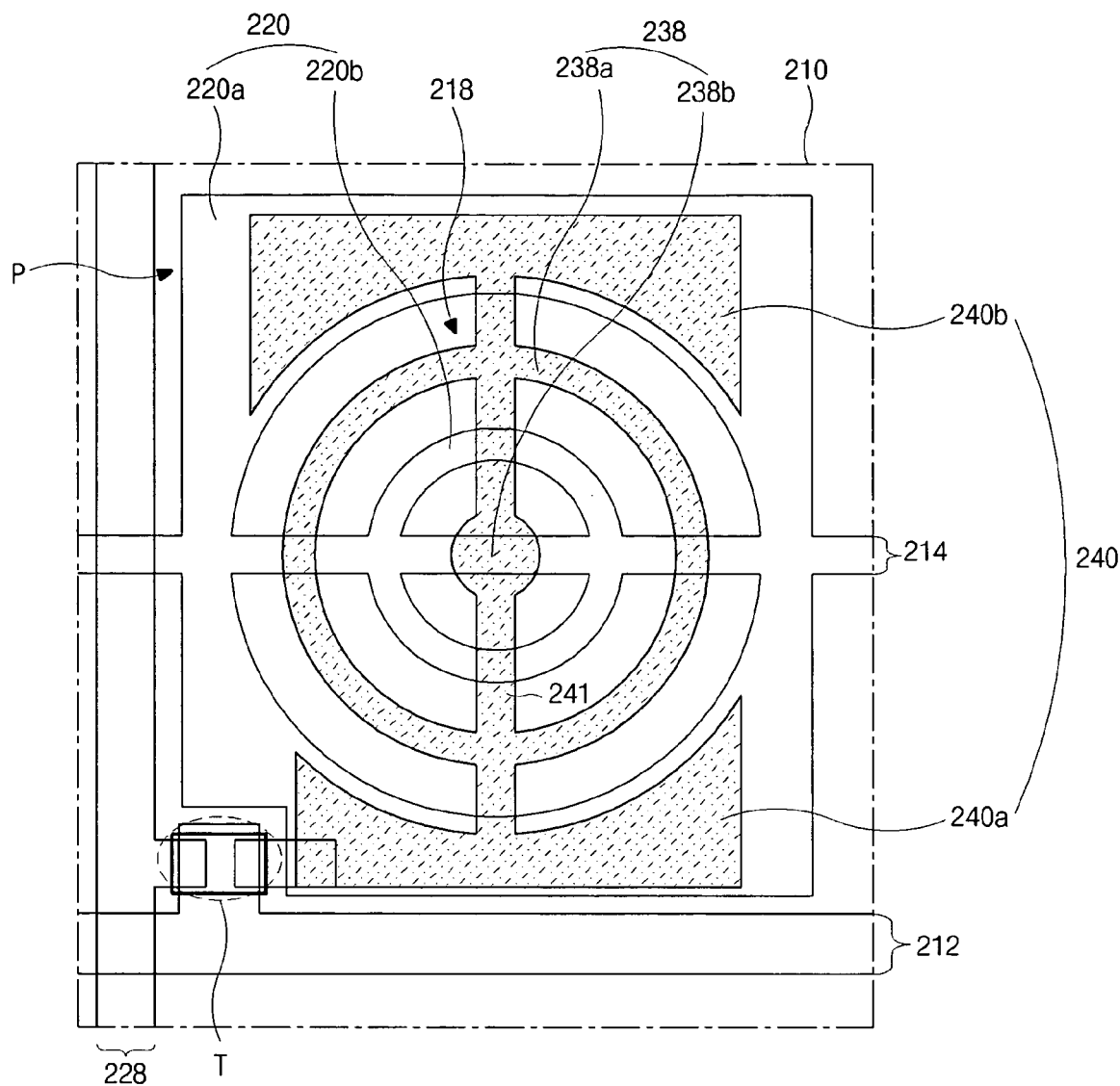
FIGS. 7A and 7B are plan views illustrating a liquid crystal display device according to a second embodiment of the present invention.
Figure 7B:
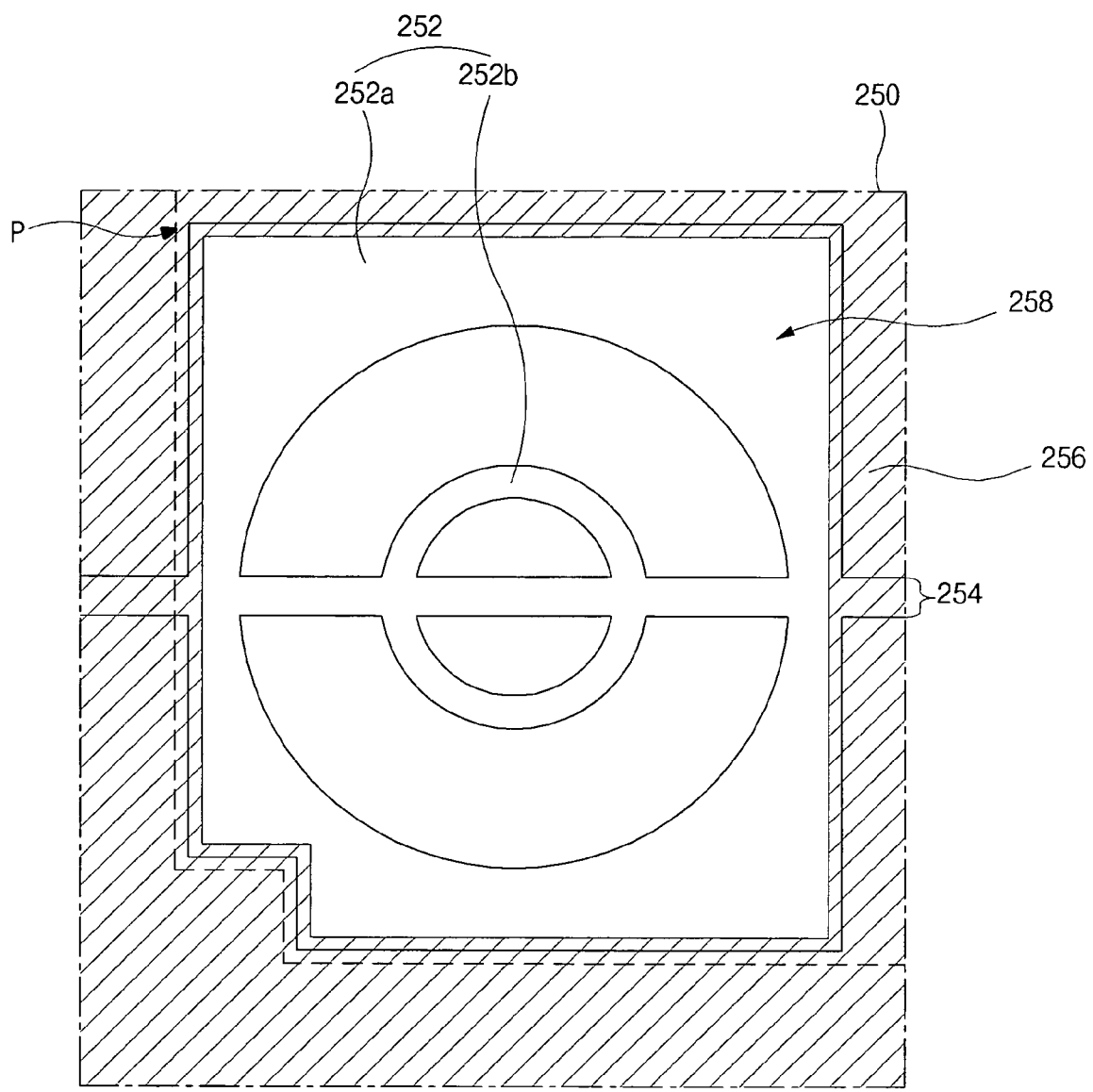

FIGS. 7A and 7B are plan views illustrating a liquid crystal display device according to a second embodiment of the present invention. FIG. 7A shows an array substrate including a thin film transistor and FIG. 7B shows a color filter substrate facing the array substrate. As shown in FIG. 7A, a gate line 212 is formed in a first direction on a first substrate 210 and a data line 228 is formed in a second direction. The gate line 212 and the data line 228 are formed to cross each other and define a pixel region P. A thin film transistor (TFT) T is disposed adjacent to a crossing of the gate line 212 and data line 228.

A common line 214 is formed in parallel to the gate line 212. A common electrode 220 connected to the common line 214 is formed in the pixel region P. The common electrode 220 includes a first common electrode pattern 220a and a second common electrode pattern 220b extending from the common line 214. The first common electrode pattern 220a is disposed in the outer portion of the pixel region P and has a circular opening 218. The second common electrode pattern 220b is disposed in the circular opening 218 of the first common electrode pattern 220a and has a circular band shape.

A pixel electrode 238 is formed in the pixel region P. The pixel electrode 238 includes a first pixel electrode pattern 238a having a circular band shape and a second pixel electrode pattern 238b having a circular shape. The first pixel electrode pattern 238a is disposed between the first and second common electrode patterns 220a and 220b, and the second pixel electrode pattern 238b is disposed inside the first pixel electrode pattern 238a.

A capacitor electrode 240 is formed outside the pixel electrode 238 and is spaced apart from the first pixel electrode pattern 238a. A space between the capacitor electrode 240 and the pixel electrode 238 can have a substantially circular band shape. The capacitor electrode 240 includes a first capacitor electrode pattern 240a and a second capacitor electrode pattern 240b, respectively, in bottom and top portions of the pixel region P in the context of the figure. The first capacitor electrode 240 is connected to the second capacitor electrode pattern 240b through a pixel connecting line 241 of the second direction and is connected to the thin film transistor T. The capacitor electrode 240 overlaps the first common electrode pattern 220a to form a storage capacitor.

The pixel connecting line 241 is formed in parallel to the data line 228 in the middle of the pixel region P and connects the first and second capacitor electrode patterns 240a and 240b. Furthermore, the pixel connecting line 241 also connects the first pixel electrode pattern 238a to the second pixel electrode pattern 238b. Accordingly, the pixel electrode 238, the capacitor electrode 240 and the pixel connecting line 241 may be formed as one integral body during the same patterning process.

As shown in FIG. 7B, an auxiliary common electrode 252 and an auxiliary common line 254 are formed on a second substrate 250. The auxiliary common electrode 252 and the auxiliary common line 254 have the same structure and receive the same voltage as the common electrode 220 and the common line 214 of FIG. 7A. When the first substrate 210 including the pixel electrode 238 and the common electrode 220 is aligned with the second substrate 250 including the auxiliary common electrode 252, the auxiliary common electrode 252 and the auxiliary common line 254 are disposed to correspond to the common electrode 220 and the common line 214 of FIG. 7A, respectively. The auxiliary common electrode 252 includes first auxiliary common electrode patterns 252a and second auxiliary common electrode pattern 252b corresponding to the first and second common electrode patterns 220a and 220b.

A black matrix 256 has an open portion 258 exposing the pixel region P and covers an edge of the first auxiliary common electrode pattern 252a. Although not shown in FIG. 7A, a color filter layer may be formed on the second substrate 250 corresponding to the open portion 258 of the black matrix 256. Thus, the black matrix 256, the color filter layer (not shown), and the auxiliary common line 254 and the auxiliary common electrode 252 are sequentially formed on the second substrate 250.

In the second embodiment, since the common electrode and the auxiliary common electrode are formed on respective substrates corresponding to each other and receive the same common voltage, an electric field between the data line and the pixel electrode becomes weaker due to an electric field between the common electrode and the auxiliary common electrode, and thus cross talk is effectively prevented. Moreover, the black matrix can be formed of a wide variety of materials, including chromium, as well as a resin material that has relatively low dielectric constant and blocks light, such as a carbon black resin. Accordingly, a material for the black matrix is more freely chosen, and thus the manufacturing costs are lowered and the competiveness of products is improved.

Figure 8:
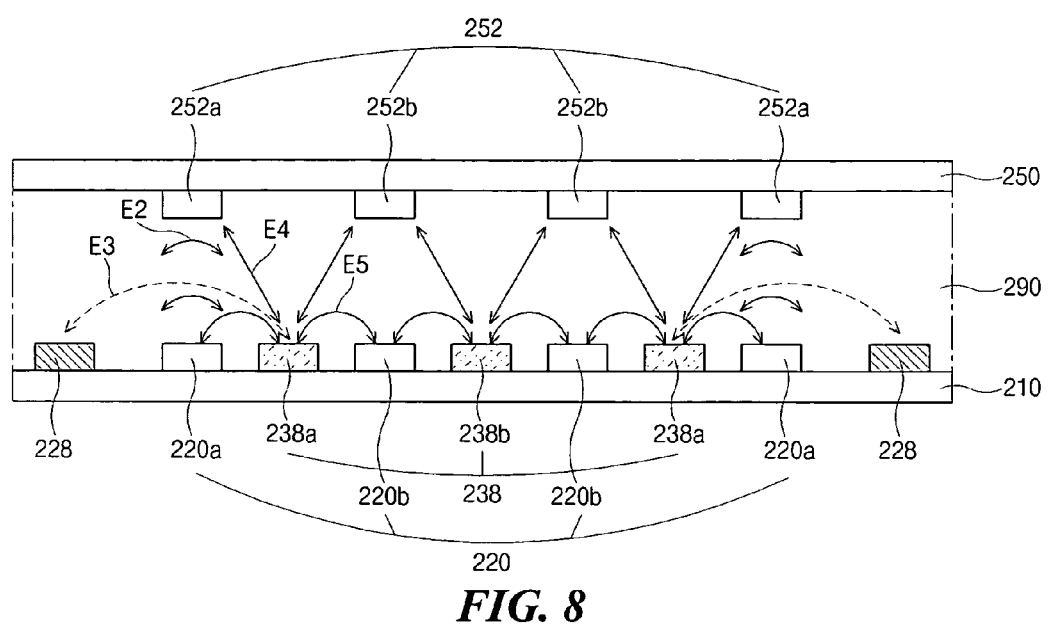
FIG. 8 is a cross-sectional view of the liquid crystal display device according to the second embodiment of the present invention.

FIG. 8 is a cross-sectional view of the liquid crystal display device according to the second embodiment of the present invention, and shows characteristics of an electric field induced between the pixel and common electrodes. As shown in FIG. 8, a first substrate 210 and a second substrate 250 are spaced apart from each other and face each other. A liquid crystal layer 290 is interposed between the first and second substrates 210 and 250. A pixel electrode 238, which includes first and second pixel electrode patterns 238a and 238b, and a common electrode 220, which includes first and second common electrode patterns 220a and 220b, are formed on the first substrate 210. The first substrate 210 may have substantially the same structure as that of FIG. 6. However, the first common electrode pattern 220a near to the data line 228 may have the same width as the second common electrode pattern 220b inside the first common electrode pattern 220a in FIG. 8, while the first common electrode pattern 174a may have a wider width than the second common electrode pattern 174b in FIG. 6. Thus, the LCD device of the second embodiment may have an increased aperture ratio as compared to the LCD device of the first embodiment.

An auxiliary common electrode 252 is formed on an inner surface of the second substrate 250. The auxiliary common electrode 252 corresponds to the common electrode 220 and receives the same voltage as the common electrode 220. The auxiliary common electrode 252 includes a first auxiliary common electrode pattern 252a corresponding to the first common electrode pattern 220a and a second auxiliary common electrode pattern 252b corresponding to the second common electrode pattern 220b. Because the same voltage is applied to the common electrode 220 and the auxiliary common electrode 252 and an electric field E2 is induced between the common electrode 220 and the auxiliary common electrode 252 due to their equipotentiality, an electric field E3 between the data line 228 and the first pixel electrode pattern 238a becomes weaker, thereby minimizing occurrence of the cross talk.

In an IPS LCD device of this embodiment, electric fields are induced between the pixel electrode 238 and the common electrode 220 on the same substrate and between the pixel electrode 238 and the auxiliary common electrode 252 on different substrates, and thus driving voltages are lowered to reduce operating costs. Although an electric field E4 between the pixel electrode 238 and the auxiliary common electrode 252 is weaker than an electric field E5 between the pixel electrode 238 and the common electrode 252, the driving voltages for forming the electric fields are lowered because all the electrodes of the first and second substrates 210 and 250 are concerned in forming the electric fields.

Figure 9A:
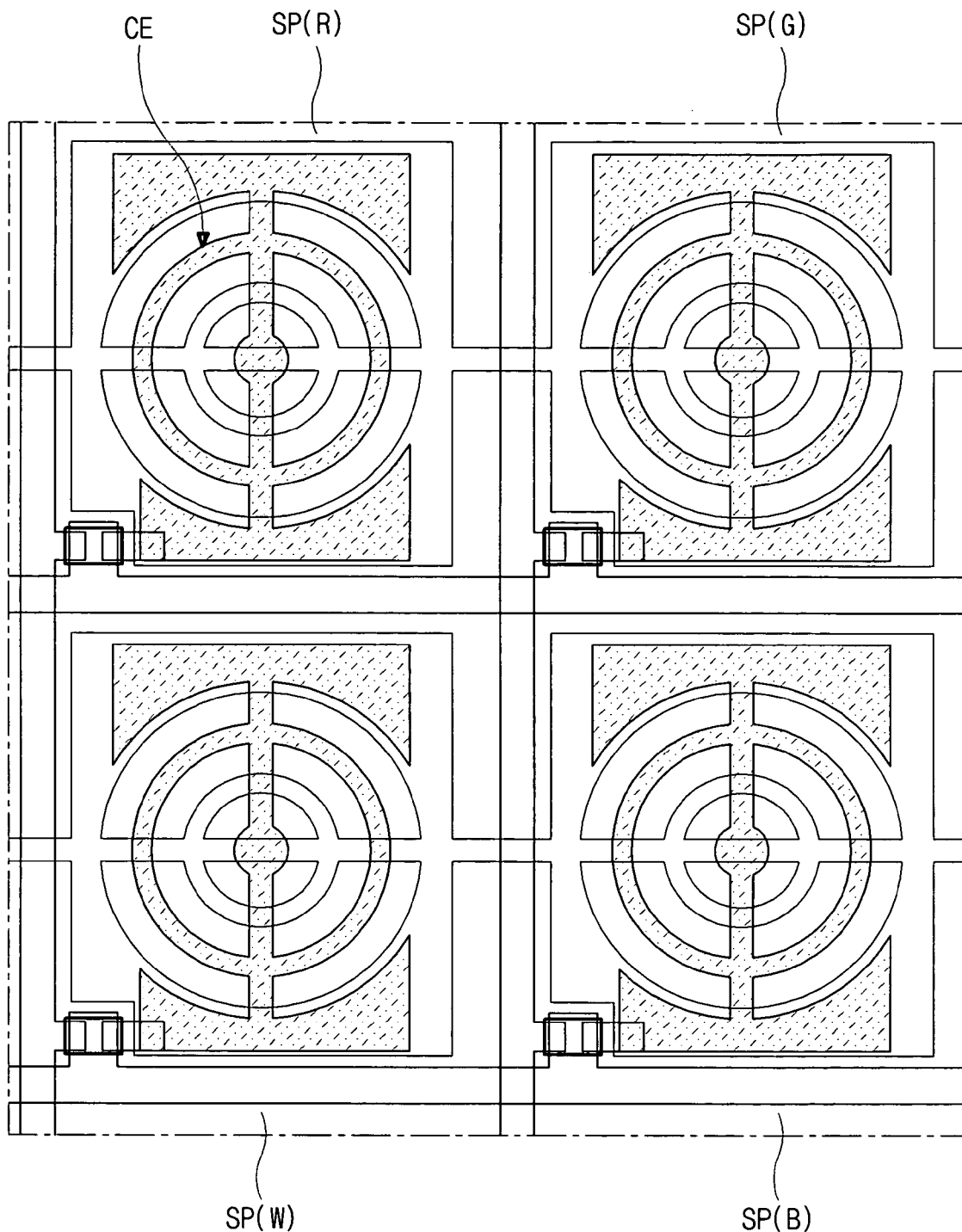
FIGS. 9A and 9B are plan views illustrating a liquid crystal display device according a third embodiment of the present invention.
Figure 9B:
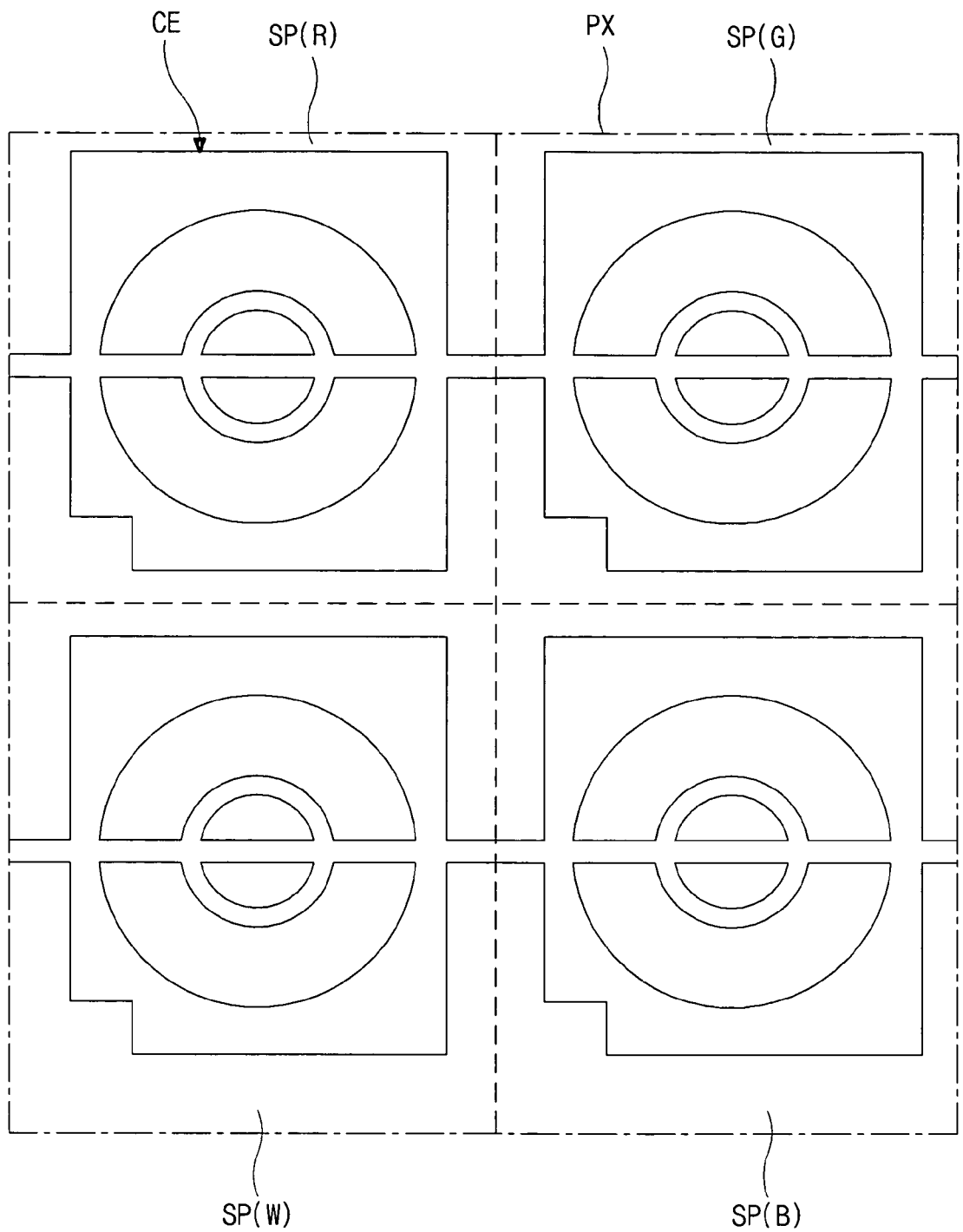

FIGS. 9A and 9B are plan views illustrating a liquid crystal display device according a third embodiment of the present invention. FIG. 9A shows an array substrate including a thin film transistor, and FIG. 9B shows a color filter substrate facing the array substrate. In embodiments of the present invention, one pixel is comprised of four sub-pixels (red, green, blue and white sub-pixels). Each sub-pixel has a perfect square structure, and thus the pixel also has a perfect square structure. Each sub-pixel of a pixel for the liquid crystal display device of the third embodiment has the same structure as that of the second embodiment.

As shown in FIGS. 9A and 9B, one pixel PX includes four sub-pixels SP(R), SP(G), SP(B) and SP(W) of red, green, blue and white respectively. Each sub-pixel SP(R), SP(G), SP(B) and SP(W) in FIG. 9A has a circular band-shaped pixel electrode and a circular band-shaped common electrode. Each sub-pixel SP(R), SP(G), SP(B) and SP(W) In FIG. 9B just has a circular band-shaped auxiliary common electrode. Because the third embodiment includes a pixel area using sub-pixels with circular shaped electrodes, the aperture ratio is improved.

Figure 10A:
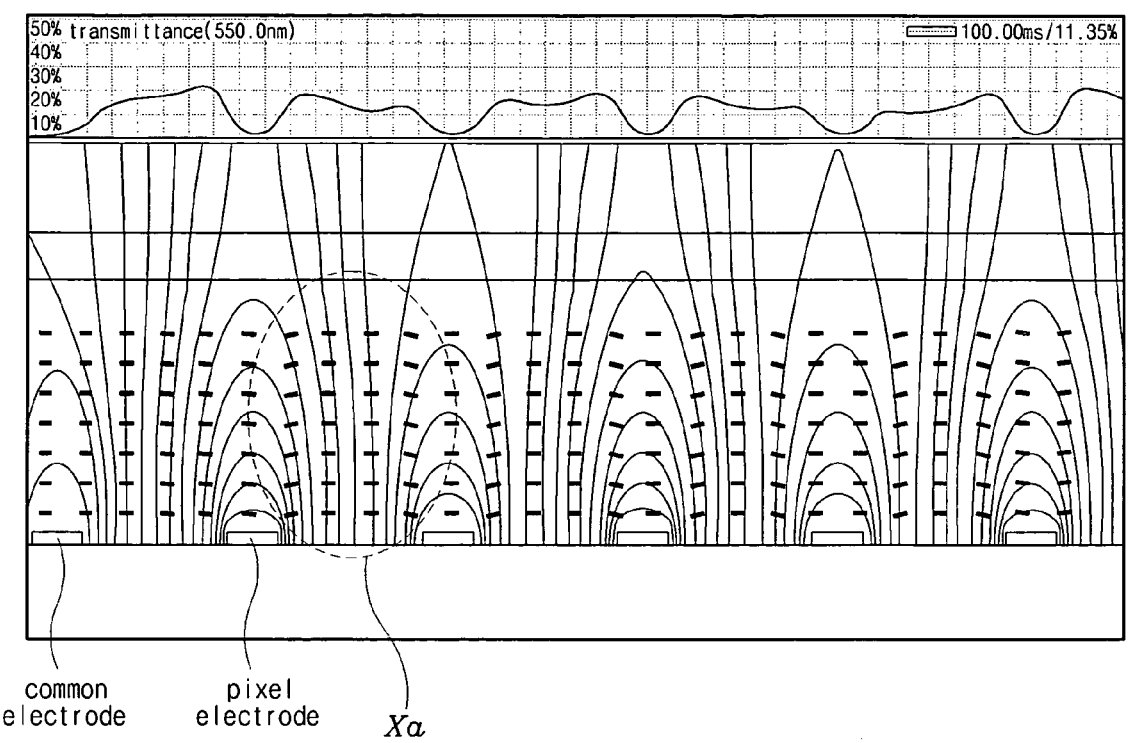
FIGS. 10A and 10B are graphs showing brightness properties of IPS LCD devices according to the second and third embodiments of the present invention, respectively.
Figure 10B:
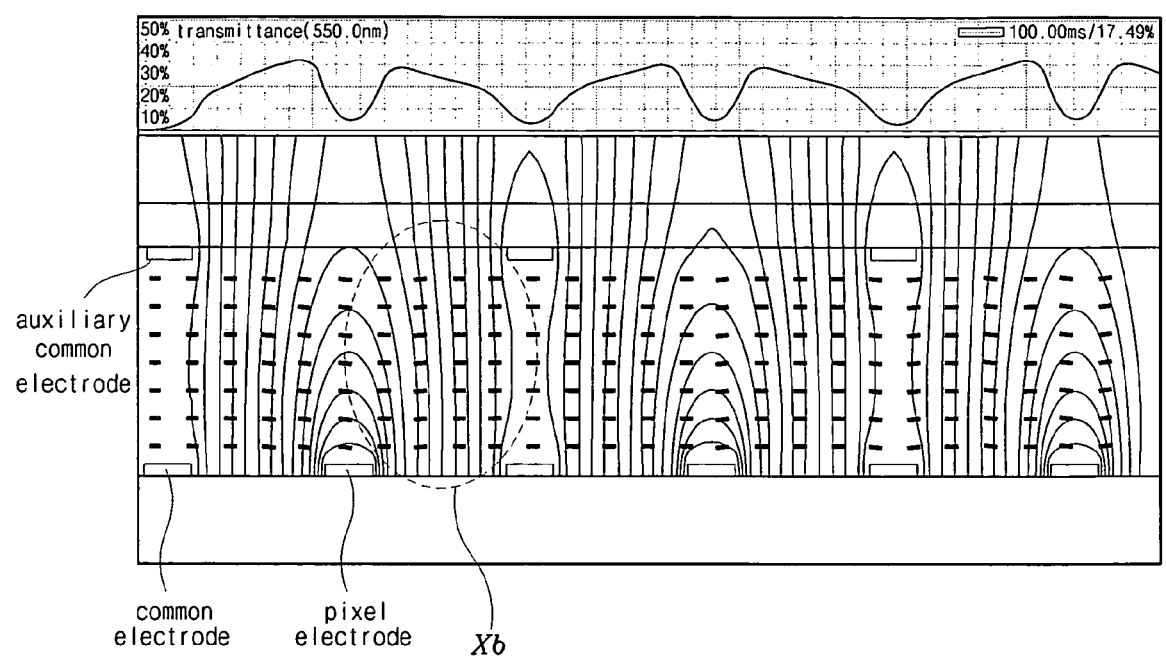

FIGS. 10A and 10B are graphs showing brightness properties of IPS LCD devices according to the second and the third embodiments of the present invention, respectively. FIG. 10A shows an IPS LCD device where electrodes are formed on a lower substrate. FIG. 10B shows an IPS LCD device where electrodes are formed on upper and lower substrates, respectively. Here, the IPS LCD devices are normally black mode, and a driving voltage of about 3V is used.

As shown in FIG. 10A, liquid crystal molecules are driven by an electric field induced between common and pixel electrodes, which are formed on the lower substrate, and average brightness in an aperture area can increase by about 20%. As shown in FIG. 10B, liquid crystal molecules are driven by the sum of an electric field induced between common and pixel electrodes, which are formed on the lower substrate, and an electric field induced between the pixel electrode and an auxiliary common electrode, which corresponds to the common electrode and is formed on the upper substrate. Average brightness in an aperture area can increase by about 30%, which is higher than the brightness increase of FIG. 10A.

Alignment properties of the liquid crystal molecules disposed in a region Xb of FIG. 10B are higher than alignment properties of the liquid crystal molecules disposed in a region Xa of FIG. 10A because the response speed of the liquid crystal molecules of FIG. 10B is faster than that of the liquid crystal molecules of FIG. 10A. The IPS LCD device of the third embodiment has a low driving voltage and an improved brightness property as compared to the second embodiment. Alternatively, the pixel electrode, the common electrode and the auxiliary common electrode can have an elliptical shape.

In embodiments of the present invention, since both the common electrode and the pixel electrode have a circular shape, directors of liquid crystal molecules are uniform in all directions, thereby improving viewing angle. Additionally, the auxiliary common electrode corresponding to the common electrode is formed on an opposite substrate, which faces a substrate including the common electrode and the pixel electrode, and the liquid crystal molecules are driven by the sum of electric fields between the common electrode, the auxiliary common electrode and the pixel electrode so that the response speed of the liquid crystal molecules is improved. The IPS LCD device of the present invention has improved brightness properties with a low driving voltage, thereby reducing operating costs. Moreover, an electric field between the data line and the pixel electrode weakens due to the equipotentiality of the common electrode and the auxiliary common electrode so that cross talk is minimized. Thus, a pattern width of the common electrode near by the data line is narrowed, thereby increasing aperture ratio. Furthermore, a wider selection of materials is available for use as a black matrix, and thus the manufacturing costs are lowered so that the competitiveness of products is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   gate lines and data lines on a first substrate, the gate lines and the data lines crossing each other and defining a pixel region;
   a thin film transistor adjacent to a crossing of the gate and data lines;
   a common line in parallel to the gate lines;
   a common electrode extending from the common line and having a circular shape, wherein the common electrode includes first and second common electrode patterns, the first common electrode pattern disposed in an outer portion of the pixel region and having a circular opening, the second common electrode pattern disposed in the circular opening of the first common electrode pattern and having a circular band shape;
   a pixel electrode connected to the thin film transistor and having a circular shape;
   a capacitor electrode electrically connected to the pixel electrode and overlapping the first common electrode pattern to form a storage capacitor;
   an auxiliary common line on a second substrate spaced apart from and facing the first substrate;
   an auxiliary common electrode extending from the auxiliary common line and having a circular shape; and
   a liquid crystal layer between the first and second substrates.

2. The device of claim 1, wherein the auxiliary common electrode receives a same voltage as the common electrode.

3. The device of claim 1, wherein the auxiliary common line and the auxiliary common electrode correspond to the common line and the common electrode.

4. The device of claim 1, wherein the common electrode alternates with the pixel electrode.

5. The device of claim 1, wherein a minimum width of the first common electrode pattern corresponds to a width of the second common electrode pattern.

6. The device of claim 1, wherein the pixel electrode includes first and second pixel electrode patterns, the first pixel electrode pattern disposed between the first and second common electrode patterns, the second pixel electrode pattern disposed inside the second common electrode pattern.

7. The device of claim 1, wherein the pixel and common electrodes have an elliptical shape.

8. The device of claim 1, further comprising a black matrix on one of the first and second substrates.

9. The device of claim 8, wherein the black matrix includes an opening exposing the pixel and common electrodes.

10. The device of claim 9, wherein the black matrix overlaps an edge of the common electrode.

11. The device of claim 8, wherein the black matrix is formed of one of a resin material and chromium (Cr).

12. The device of claim 1, wherein the pixel region has a substantially rectangular structure.

13. The device of claim 12, wherein the liquid crystal display device includes a pixel having red, green, blue and white sub-pixels, wherein each sub-pixel corresponds to the pixel region.

14. A method of fabricating a liquid crystal display device, comprising:

forming a common electrode having a circular shape on a first substrate, wherein the common electrode includes first and second common electrode patterns, the first common electrode pattern disposed in an outer portion of the pixel region and having a circular opening, the second common electrode pattern disposed in the circular opening of the first common electrode pattern and having a circular band shape;

forming a pixel electrode having a circular shape on the first substrate, the common electrode alternating with the pixel electrode;

forming a capacitor electrode electrically connected to the pixel electrode and overlapping the first common electrode pattern to form a storage capacitor;

forming an auxiliary common electrode having a circular shape on a second substrate; and forming a liquid crystal layer between the first and second substrates.

15. The method of claim 14, further comprising forming a common line connected to the common electrode and forming an auxiliary common line connected to the auxiliary common electrode, wherein the common line and the auxiliary common line are positioned to face each other.

16. The method of claim 14, further comprising forming a black matrix on one of the first and second substrates, the black matrix formed of one of a resin and chromium (Cr).

17. The method of claim 14, wherein forming a common electrode having a circular shape on a first substrate includes forming a common electrode having a circular band shape.

18. The method of claim 14, wherein forming a pixel electrode having a circular shape on the first substrate includes forming a pixel electrode having a circular band shape.

19. The method of claim 14, wherein forming an auxiliary common electrode having a circular shape on a second substrate includes forming an auxiliary common electrode having a circular band shape.

20. The method of claim 14, wherein the auxiliary common electrode receives a same voltage as the common electrode.

21. The method of claim 14, wherein a minimum width of the first common electrode pattern corresponds to a width of the second common electrode pattern.

22. The method of claim 14, wherein the pixel electrode includes first and second pixel electrode patterns, the first pixel electrode pattern disposed between the first and second common electrode patterns, the second pixel electrode pattern disposed inside the second common electrode pattern.

23. The method of claim 14, wherein the pixel and common electrodes have an elliptical shape.

24. The method of claim 16, wherein the black matrix includes an opening exposing the pixel and common electrodes.

25. The method of claim 24, wherein the black matrix overlaps an edge of the common electrode.

26. The method of claim 14, wherein the pixel region has a substantially rectangular structure.

27. The method of claim 26, wherein the liquid crystal display device includes a pixel having red, green, blue and white sub-pixels, wherein each sub-pixel corresponds to the pixel region.

* * * * *